(12) United States Patent
Kawamura et al.

(10) Patent No.: US 9,091,587 B2
(45) Date of Patent: Jul. 28, 2015

(54) LABEL PRINTING SCALE DEVICE

(75) Inventors: Ryoichi Kawamura, Shiga (JP); Kengo Aoyama, Shiga (JP)

(73) Assignee: ISHIDA CO., LTD., Kyoto (JP)

( * ) Notice: Subject to any disclaimer, the term of this patent is extended or adjusted under 35 U.S.C. 154(b) by 211 days.

(21) Appl. No.: 13/403,755

(22) Filed: Feb. 23, 2012

(65) Prior Publication Data

US 2012/0217069 A1    Aug. 30, 2012

(30) Foreign Application Priority Data

Feb. 25, 2011 (JP) .................................. 2011-039501

(51) Int. Cl.
*G01G 19/40*   (2006.01)
*G01G 21/28*   (2006.01)
*G01G 19/414*  (2006.01)
*G01G 23/38*   (2006.01)
*G01G 23/48*   (2006.01)
*G01G 23/37*   (2006.01)

(52) U.S. Cl.
CPC ............. *G01G 21/28* (2013.01); *G01G 19/4144* (2013.01); *G01G 23/38* (2013.01); *G01G 23/48* (2013.01); *G01G 23/3728* (2013.01)

(58) Field of Classification Search
CPC ............ G01G 19/414; G01G 19/4144; G01G 19/4146; G01G 19/415; G01G 21/28; G01G 21/283; G01G 23/00; G01G 23/01; G01G 23/16; G01G 23/36; G01G 23/3707; G01G 23/3721; G01G 23/3728; G01G 23/3735; G01G 23/38; G01G 23/40; G01G 23/42; G06K 13/067; G06K 15/16; G07B 1/02; G07G 1/0018; G07G 1/0027; G07G 1/0036; G07G 1/01; G07G 1/14; G07G 5/00

USPC ................... 177/25.13–25.15, 126, 127, 180, 177/238–244

See application file for complete search history.

(56) References Cited

U.S. PATENT DOCUMENTS

| | | | | |
|---|---|---|---|---|
| 4,274,500 A | * | 6/1981 | Kuhnle ..................... | 177/25.15 |
| 4,351,403 A | * | 9/1982 | Ferguson .................... | 177/2 |
| 4,526,246 A | * | 7/1985 | Patoray ....................... | 177/179 |
| 4,526,247 A | * | 7/1985 | EerNisse et al. ......... | 177/210 FP |
| 4,601,355 A | * | 7/1986 | Takahashi .................. | 177/2 |
| 4,700,791 A | * | 10/1987 | Iwasaki et al. ............ | 177/2 |
| 4,700,792 A | * | 10/1987 | Tajima et al. ............. | 177/178 |
| 4,836,309 A | * | 6/1989 | Sekioka ..................... | 177/25.15 |
| 5,052,504 A | * | 10/1991 | Ikeda et al. ................ | 705/21 |

(Continued)

FOREIGN PATENT DOCUMENTS

| | | |
|---|---|---|
| DE | 2836010 A1 | 2/1980 |
| EP | 0052771 A1 | 6/1982 |

(Continued)

OTHER PUBLICATIONS

Extended European Search Report of the corresponding European Patent Application No. 12157022.0, dated Apr. 1, 2015.

*Primary Examiner* — Peter Macchiarolo
*Assistant Examiner* — Natalie Huls
(74) *Attorney, Agent, or Firm* — Global IP Counselors, LLP (57) ABSTRACT

A label printing scale device includes separable casings that are vertically overlaid in two levels, one on top of the other. Specifically, the label printing scale device includes an upper casing housing at least a load cell and a circuit part, and a lower casing housing at least power-generation circuit, a printer, and a control part.

17 Claims, 11 Drawing Sheets

(56) References Cited

U.S. PATENT DOCUMENTS

| | | | |
|---|---|---|---|
| 5,227,966 A * | 7/1993 | Ichiba | 705/16 |
| 6,972,384 B2 * | 12/2005 | Huitt et al. | 177/25.13 |
| 7,053,316 B2 * | 5/2006 | Murdter | 177/25.13 |
| 7,183,506 B2 * | 2/2007 | Teraoka et al. | 177/2 |
| 7,232,963 B2 * | 6/2007 | Leisinger et al. | 177/238 |
| 7,868,743 B1 * | 1/2011 | Brown | 340/309.4 |
| 2003/0205412 A1 * | 11/2003 | Hewitt et al. | 177/25.15 |
| 2010/0000801 A1 * | 1/2010 | Smith et al. | 177/25.15 |
| 2013/0126248 A1 * | 5/2013 | Yamaguchi et al. | 177/3 |

FOREIGN PATENT DOCUMENTS

| | | |
|---|---|---|
| GB | 2028520 A | 3/1980 |
| JP | 2002-310776 A | 10/2002 |
| JP | 2002-350225 A | 12/2002 |
| JP | 3534205 B2 | 6/2004 |
| JP | 3568609 B2 | 9/2004 |
| JP | 2008-64497 A | 3/2008 |
| JP | 2009-14455 A | 1/2009 |
| JP | 4449310 B2 | 4/2010 |

* cited by examiner

LABEL PRINTING SCALE DEVICE

TECHNICAL FIELD

The invention relates to a label printing scale device used for selling meat, prepared foods, or the like by weight.

BACKGROUND ART

It is well-known that the output sensitivity and/or zero-point output of load cells used as weight sensors are often influenced by changes in the temperature of their surroundings. Examples of attempts to solve this problem in measuring devices in which these load cells are built-in include connecting temperature-compensating resistance to the output circuit of the load cell (Japanese Patent Registration No. 3534205), implementing automatic tracking for automatically updating the zero point during periods of no load (Japanese Patent Registration No. 3568609), and detecting the temperature within the casing, applying a correction coefficient to the output of the load cell, and reducing the effects due to temperature drift (Japanese Laid-Open Patent Application No. 2008-64497).

On the other hand, at super markets and other counter sales locations, counter-sales-type label printing scale devices are employed, to measure meat, prepared foods, and other products, unit prices are applied to the product based upon the measured weight, and prices are calculated and printed on labels and/or receipts. However, as disclosed in Japanese Laid-Open Patent Application No. 2002-310776, Japanese Patent Registration No. 4449310, and Japanese Laid-Open Patent Application No. 2009-14455, in such measuring devices, the load cell, which does not readily tolerate changes in temperature, is housed together in the main casing with power-generation circuits, printers, and other components that generate heat due to electrical currents, and therefore particular care must be taken with temperature compensation for load cells housed in such devices.

SUMMARY OF INVENTION

Technical Problem

The load cells mounted in measurement devices of this type therefore require high-precision temperature compensation, and have corresponding high manufacturing costs. Power-generation circuits, load cells, circuit boards, printers, and the like are housed within a main casing, and making the main casing more compact has therefore also been problematic. When a cooling fan is used to cool the interior of the main casing, problems have been presented in that the air flow affects and destabilizes the output of the load cells.

It is an object of the invention to provide an inexpensive label printing scale device that can solve all such problems.

Solution to Problem

In order to achieve the above object, a label printing scale device according to a first aspect of the present invention includes an upper casing and a lower casing. The upper casing houses a load cell and an A/D conversion circuit part. The load cell is configured to output an analog signal representing measured weight of a measured object loaded on a weighing tray operably coupled to the load cell. The A/D conversion circuit part is configured to convert the output from the load cell into a digital weight signal. The lower casing houses a control part, a printer, and a power-generation circuit. The control part is configured to receive the digital weight signal outputted by the circuit part, and output printing data. The printer prints predetermined items on a label or a receipt based on the printing data. The power-generation circuit supplies electrical power to at least the control part and the printer, wherein the upper casing and the lower casing are positioned so as to be vertically overlaid and the upper casing and lower casing configured to be separated from one another.

According to this configuration, the contents, which unavoidably raises temperature, such as the power-generation circuit and the load cell, which does not readily tolerate increases in temperature, are physically isolated from each other, and the effect on the load cell from the heat generation of the power-generation circuit is eliminated. Temperature compensation for the load cell can therefore be kept at a minimal level. The load cell and the power-generation circuit that are conventionally housed close together within a single casing are housed separately, one in an upper casing and the other in a lower casing. The width of the casing itself can therefore be reduced. Additionally, the cooling fan for cooling the power-generation circuit is housed in the lower casing, which is not where the load cell is housed. There are therefore no effects on the load cell from the air flow of the cooling fan.

A device according to a second aspect of the present invention is the label printing scale device according to the first aspect, wherein the upper casing includes a metal base member having a leg part and a metal tray-receiving member laid above the base member without making contact therewith. The weighing tray is mounted on the tray-receiving member, wherein the tray-receiving member and the base member are vertically coupled to one another via the load cell.

According to this configuration, even when the temperature within the lower casing rises, the upper casing, which is separated from the lower casing, includes metal members having excellent thermal conductivity, and since the device is usually exposed indoors, the device is maintained at approximately room temperature. Both the load cell and the circuit part that are surrounded by these metal members are maintained at room temperature, which changes slowly, and therefore temperature compensation for the load cell can be kept at a minimal level.

A device according to a third aspect of the present invention is the label printing scale device according to the first aspect, including a battery for supplying power to the load cell and the circuit part; a transmitting part for wirelessly transmitting the digital weight signal outputted by the circuit part; and a receiving part for wirelessly receiving the digital weight signal and outputting the signal to the control part, wherein the battery and the transmitting part are provided to the upper casing; and the receiving part is provided to the lower casing.

According to this configuration, the weight signal can be wirelessly transmitted from the upper casing to the lower casing, which is separated from the upper casing. The upper casing, on which the weighing tray is mounted, can therefore be moved to and used at a convenient location. A load cell having a short height is used in the upper casing, whereby the upper casing can made thinner and flatter. Advantages are therefore presented in that, if the thin upper casing is disposed on a show case, meat, prepared foods, and other items can be readily loaded onto and unloaded from the weighing tray.

A device according to a fourth aspect of the present invention is the label printing scale device according to the third aspect, wherein the battery is a rechargeable secondary cell; and when the upper casing is mounted on the lower casing, the secondary cell is electrically connected to the power-generation circuit, and power is supplied.

According to this configuration, the upper casing and the lower casing are separated during usage. When not in use, the secondary battery can be charged merely by laying the upper casing on top of the lower casing. A large-capacity battery that is capable of withstanding long periods of use therefore need not be mounted, and therefore the upper casing can be made more compact.

A device according to a fifth aspect of the present invention is the label printing scale device according to the fourth aspect, includes a wireless power-supply device for wirelessly supplying electrical power from the power-generation circuit to the secondary cell.

According to this configuration, the secondary cell can be wirelessly charged, and therefore the upper casing and the lower casing can be freely joined and separated. The positional configuration of the casings can therefore be changed freely according to the location of usage, and the general utility of the label printing scale device is increased.

A device according to a sixth aspect of the present invention is the label printing scale device according to the first aspect, including a touch panel for allowing the device to be operated, the touch panel being installed on a primary side surface of the lower casing; a display part for displaying a product name, a weight, and a price, the display part being provided to a secondary side surface., the secondary side surface being opposite from the primary side surface; and an issuing aperture for the label and/or the receipt of the printer, the issuing aperture being formed on an upper part on a back side of the touch panel.

According to this configuration, the touch panel can be positioned on the front surface of the printer, and therefore the width of the touch panel can be expanded across the entire width of the lower casing. In conventional devices, the issuing aperture of the printer is aligned to the side of the touch panel, and therefore the width of the main casing was wide, but in the device of the present aspect, the issuing aperture of the printer is located on the back surface of the touch panel, and therefore the width of the lower casing can be made more compact.

A device according to a seventh aspect of the present invention is the label printing scale device according to the sixth aspect, includes a cassette-insertion gate provided to a front surface of the printer and includes a locking mechanism. The touch panel is coupled to the locking mechanism such that when the touch panel is flipped up, the cassette-insertion gate is unlocked by the motion of the touch panel.

According to this configuration, the cassette-insertion gate of the printer can be opened and the cassette inserted or removed merely by flipping up the touch panel. The cassette can therefore be readily inserted or removed, and the labels and/or receipts housed therein can be more readily exchanged.

A device according to an eighth aspect of the present invention is the label printing scale device according to any of the first through fifth aspects, including a pole standing on a secondary side surface of the lower casing, a display part for displaying a product name, a weight, and a price being provided to an upper end of the pole.

According to this configuration, the display part can be raised to a readily viewable height even when the label printing scale device is disposed on a cooking counter, table, or at another comparatively low location, and the device can therefore also be applied to fish dealers or other sales formats in which show cases are not present.

Advantageous Effects of Invention

According to the invention, temperature compensation for the load cell can be kept at a minimal level sufficient merely for limiting the effects of changes in room temperature, and therefore an inexpensive label printing scale device having limited manufacturing costs can be provided. The width of the device can be made more compact than in conventional devices, and advantages are therefore presented in that the device does not occupy as much space as conventional devices even during use when disposed on show cases. The thin upper casing on which the weighing tray is mounted can be used when separated from the lower casing, which is thicker due to housing the power-generation circuit, and therefore measured objects can be readily loaded onto and unloaded from the weighing tray if the thin upper casing alone is disposed on the show case. Even when a fan is provided for cooling the power-generation circuit, there is absolutely no effect on the load cell from the air flow of the cooling fan.

DESCRIPTION OF EMBODIMENTS

An embodiment of the invention will be described below on the basis of the drawings.

Figure 1:
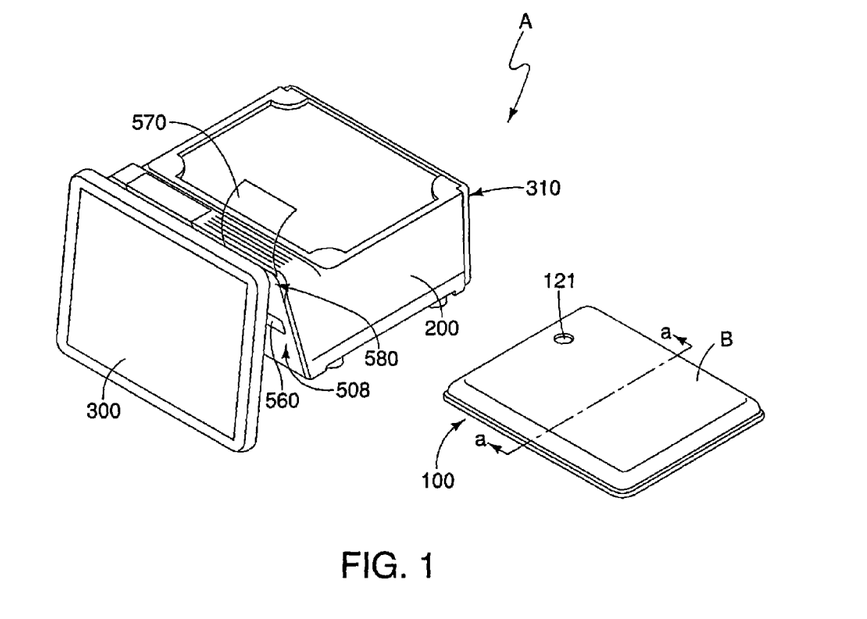
FIG. 1 is an exterior perspective view of a label printing scale device according to an embodiment of the invention.

FIG. 1 shows an exterior perspective view of a label printing scale device A according to an embodiment of the invention. In particular, this diagram shows a state in which an upper casing 100 has been taken off a lower casing 200, where a weighing tray B is loaded on the upper casing 100.

In FIG. 1, the label printing scale device A is provided with the lower casing 200 and the upper casing 100. A touch panel 300 is attached to the front surface of the lower casing 200, and a customer-side display part 310 is attached to the back surface of the lower casing 200. The weighing tray B is mounted on the upper casing. The casings 100, 200 are separable, and the upper casing 100 can be laid on top of the lower casing 200.

Figure 2:
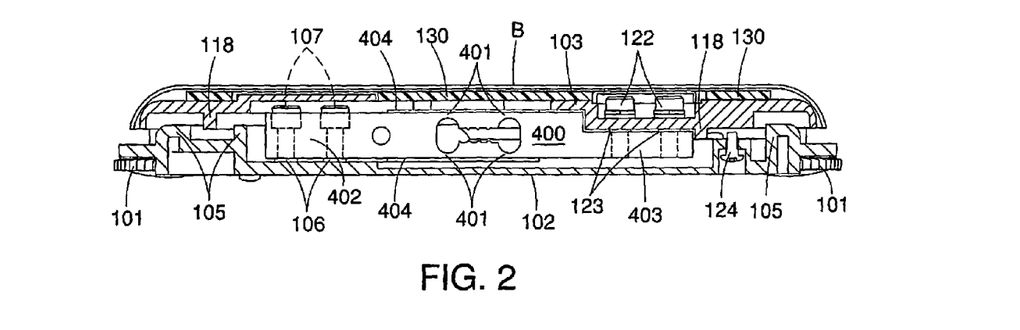
FIG. 2 is a cross-sectional view of the upper casing in FIG. 1 as seen from the a-a direction.

As shown in the cross-sectional diagram of FIG. 2, the upper casing 100 includes a metal base member 102, to which leg parts 101 are provided, and a metal tray-receiving member 103, which lays on top of but does not contact the base member 102. Both members 102, 103 are joined together vertically via a load cell 400. The metal weighing tray B covers the upper surface of the tray-receiving member 103.

Figure 3:
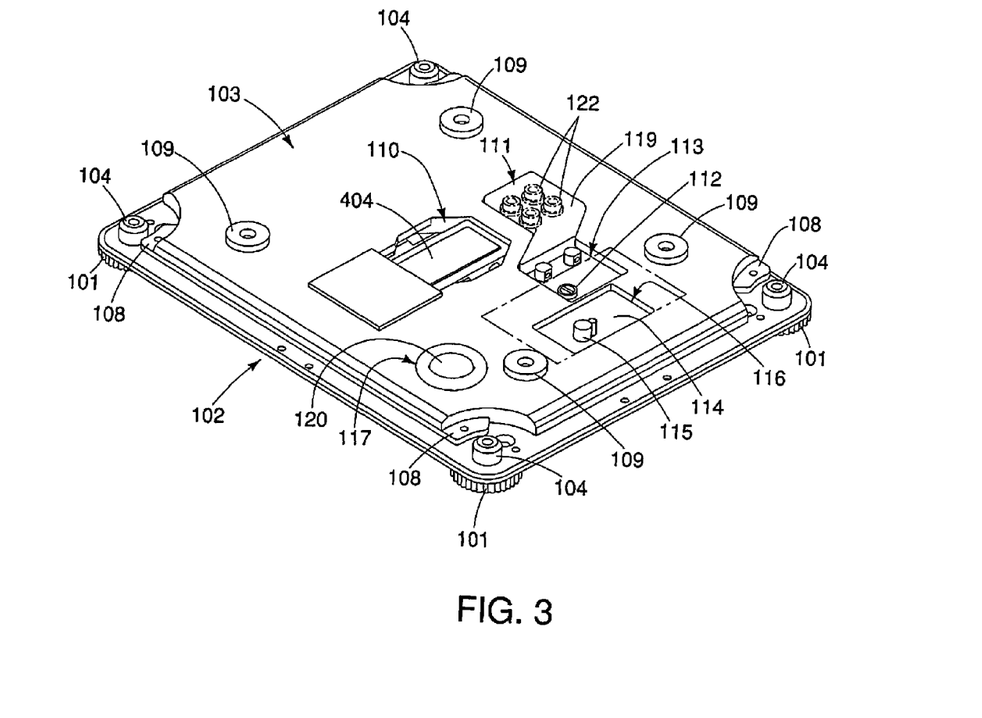
FIG. 3 is an exterior perspective view in which the weighing tray has been removed from the upper casing.

As shown in FIG. 3, the base member 102 has a rectangular shape overall. Boss parts 104 in which female screws have been created are formed at the four corners of the base member. Axial bolts of the leg parts 101 are screwed into the female screws of the boss parts 104. Adjusting the amount of screwing-in of the leg parts allows the levelness of the base member 102 to be adjusted.

As shown in FIG. 2, a reinforcing rib 105 that surrounds the area of the load cell 400, and a reinforcing rib (not shown) that expands outward from that area are formed on the upper surface of the base member 102. Washer-shaped boss parts 106 are formed on the load-cell-attaching surface of the base member 102. Bolts 107 are screwed into female screws that pass through the boss parts 106, and the load cell 400 is fixed to the base member 102.

The tray-receiving member 103 forms a uniform rectangular shape, as shown in FIG. 3. The four corners of the tray-receiving member 103 are cut out in an arcuate shape so as to avoid interfering with the boss parts 104. Horizontal brackets 108 are provided to the cut surfaces. Screw holes are provided to the brackets 108. Adjusting bolts (not shown) that act as stoppers are screwed in. The gap between the distal ends of these bolts and the base member 102 is adjusted, whereby the adjusting bolts can be used to keep the tray-receiving member 103 from sinking excessively low.

Rubber bushes 109 for inserting pins provided to the rear surface of the weighing tray B are attached at four locations on the upper surface of the tray-receiving member 103. A tool-insertion window 110 for repairing bias placement error in the load cell 400 is provided to the center part of the tray-receiving member 103. A bolt attachment window 111 for fixing the tray-receiving member 103 to the load cell 400, an span-adjusting window 113 for operating a span-adjusting screw 112, a window 116 for releasing electronic components 115 of a circuit board 114 (circuit part 140 in FIG. 10) attached to the base member 102, and a viewing window 117 for viewing a leveling instrument 120 are provided to the side of the tool-insertion window 110. When the weighing tray B is placed on top, a cushion member 130 is interposed on the upper surface of the tray-receiving member 103, as shown in FIG. 2. The weighing tray B is laid on top of the cushion member and fixed to the tray-receiving member 103.

A reinforcing rib 118 that fits to the rib 105 of the base member 102 without making contact is provided to the rear surface of the tray-receiving member 103. A sealing cover 119 is laid on top of the span-adjusting window 113, but in FIG. 3 the cover 119 is shown in a state of attachment extending to the bolt attachment window 111. The leveling instrument 120 for viewing the levelness of the base member 102 is attached to the base member 102. The through-hole 117 that fits to the leveling instrument 120 without making contact is provided to the tray-receiving member 103, and a viewing window 121 (see FIG. 1) for viewing the leveling instrument 120 is provided to the weighing tray B. A space for housing a battery 160 (FIG. 10) and a space for housing a circuit board (transmitting part 150 in FIG. 10) in which a wireless module is installed are provided to the rear-surface side of the base member 102.

As shown in FIG. 2, the load cell 400 has a well-known structure in which a strain gauge is affixed to a thin-walled vertical strain-receiving part 401 that is hollowed out in the shape of spectacles in the center, but, particularly in this embodiment, the load cell 400 is made to be as flat as possible, and the overall structure of the upper casing 100 is made thin.

A fixed part 402 that is on the left side of the load cell 400 is fixed to the base member 102 by bolts 107, and a movable part 403 on the right side is fixed to the tray-receiving member 103 by bolts 122. The tray-receiving member 103 is supported via the load cell 400 by the base member 102. Washer-shaped bosses 123 are formed on the lower surface of the tray-receiving member 103 that is fixed to the movable part 403. The effect on the strain gauge of fastening the bolts 107, 122 is lessened by the bosses 123 and the bosses 106 that are formed on the base member 102.

A step part is provided to the movable part 403 of the load cell 400 one level lower than the strain-receiving part 401. The heads of the bolts 122 are accommodated within the upper casing 100. A desiccant 404 is affixed to the upper and lower surfaces of the strain-receiving part 401, to which the strain gauge is affixed. A screw hole that passes vertically is provided to the base member 102 near the movable part 403. A bolt 124 that is used as a stopper is screwed into the hole from the bottom surface. Adjusting the degree of screwing-in allows the movable part 403 to be kept from sinking too far down.

Figure 4:
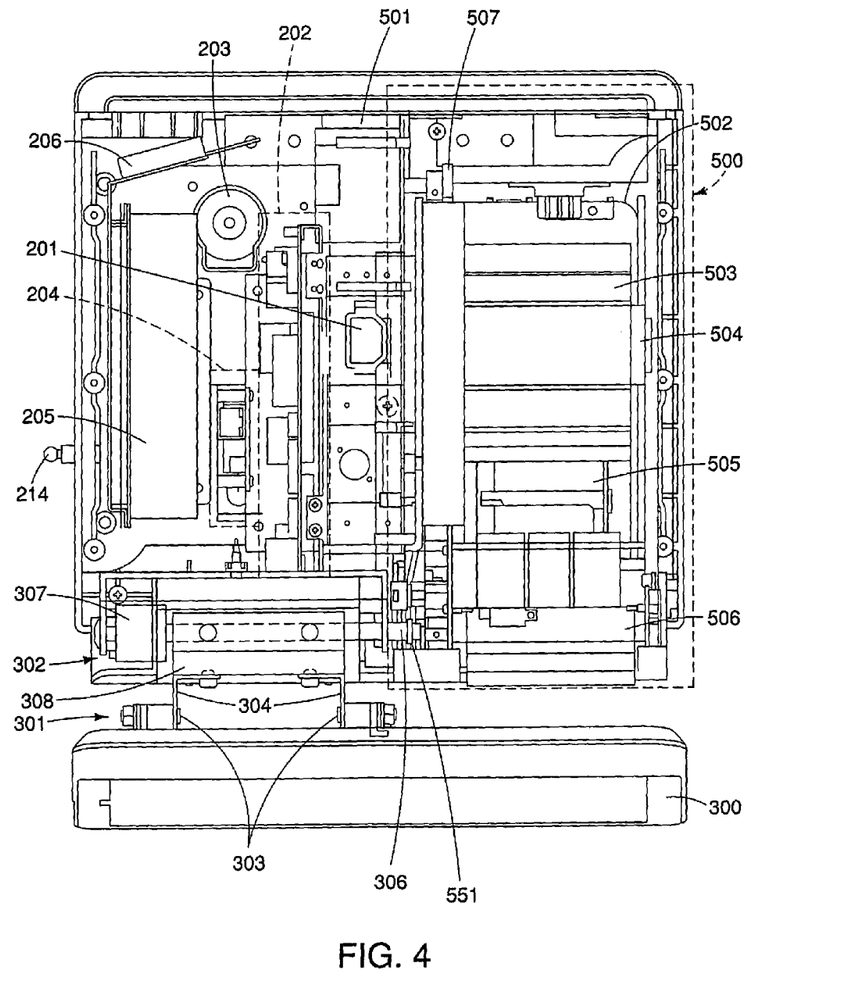
FIG. 4 is a plan view of the interior of the lower casing when the upper lid of the lower casing has been removed.

FIG. 4 shows the positional configuration of the devices within the lower casing 200 when the upper lid has been removed. A cassette-type printer 500 (the portion surrounded by broken lines) is positioned in the right half To the left of the printer is positioned a driving motor 501 of the printer 500 and a power-source connector 201. Further left is a circuit board 202 on which a computer is mounted. To the left of the circuit board 202 are a speaker 203 and a circuit board 204 in which a wireless communication module is installed. Positioned still further to the left are a power generation circuit 205 and a cooling fan 206 for cooling the power generation circuit. An antenna 214 that extends to the outside through the rear surface of the lower casing 200 is connected to the circuit board 204 of the wireless module.

The printer 500 is provided with a cassette 502 that can be inserted into and removed from the main printer body. Provided to the cassette 502 are a holder 504 on which a roll 503 of labels and/or receipts 570 (see FIG. 1) is mounted, an uptake roller 505 for rolling up label sheets, and a printing roller 506. When the cassette 502 is inserted into the main printer body, driving gears of the uptake roller 505 and the printing roller 506 intermesh via a gear train, and rotational force is transmitted to a driving gear 507 of the driving motor 501.

Figure 5:
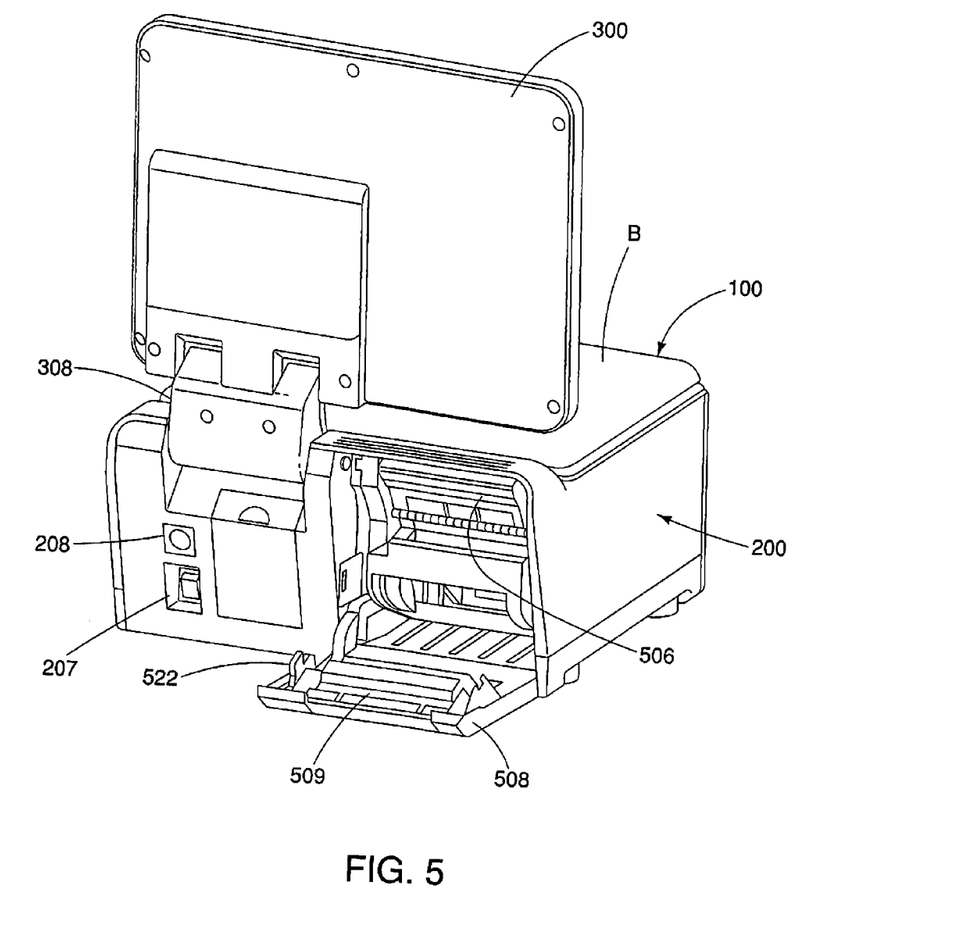
FIG. 5 is an exterior perspective view in which the touch panel of the front surface of the lower casing has been flipped up.

The touch panel 300 is provided to the side where the cassette 502 is removed and inserted (the front surface), and therefore when the touch panel 300 on the front surface is flipped up in this embodiment, as shown in FIG. 5, the lock of a gate 508 that inserts into the cassette 502 releases in a linked fashion, and the gate 508 is opened to face downward.

A thermal head 509 is attached inside the gate 508 on the distal end thereof, and the locking mechanism is provided to the region below the thermal head. When the opened gate 508 is returned to the original position, the thermal head 509 comes into close contact with the printing roller 506, the locking mechanism comes into action, and the gate 508 is held in the closed position.

Figure 9:
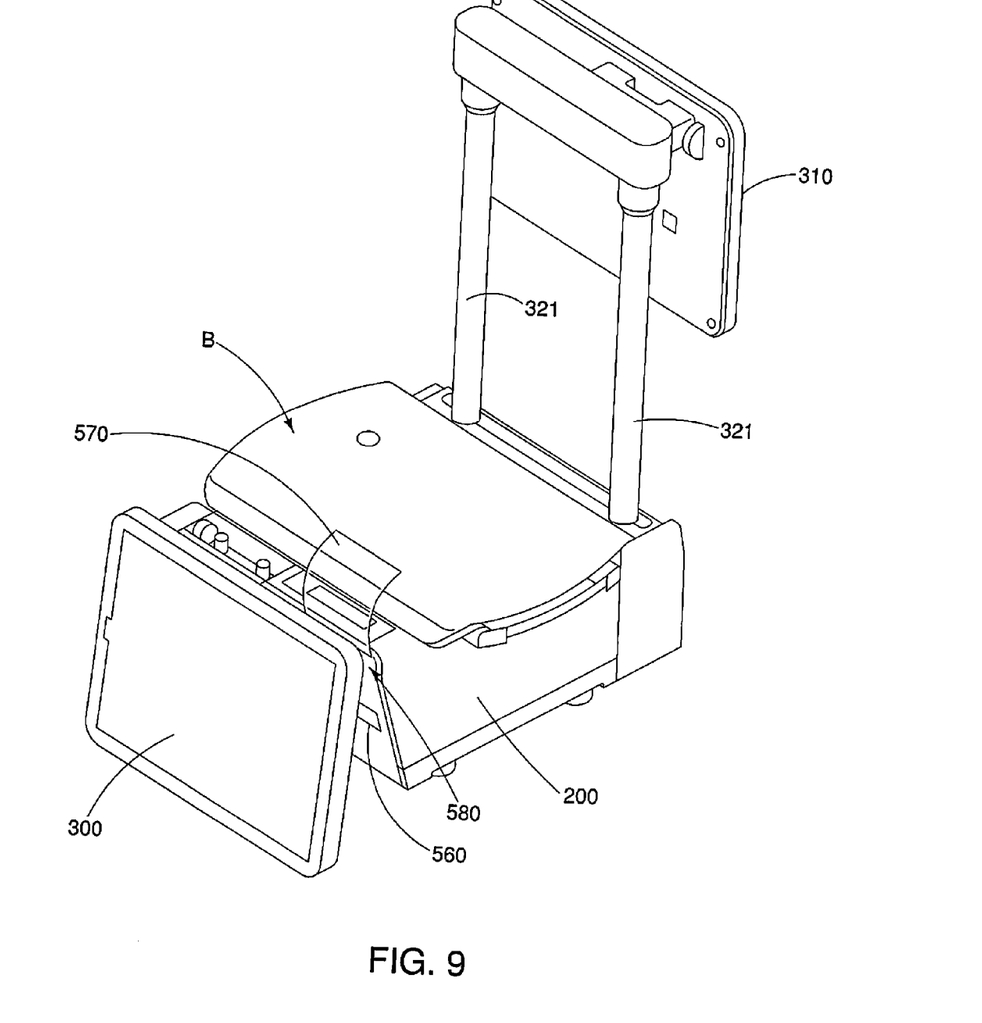
FIG. 9 is an exterior perspective view of a label printing scale device according to a further embodiment of the invention.

In the printer 500, an issuing aperture 580 for the labels and/or receipts 570 is provided to the distal end of the closed gate 508, and the labels and/or receipts 570 are issued therefrom inclined at an angle of 35° with respect to the vertical plane. The issued labels and/or receipts 570 therefore do not interfere with the touch panel 300, as shown in FIGS. 1 and 9.

Contact with the weighing tray B arranged to the rear of the issuing aperture 580 can also be prevented. In FIG. 5, the upper casing 100 on which the weighing tray B is mounted is shown laid on top of the lower casing 200. A power switch 207 is provided toward the front surface of the lower casing 200 when the touch panel 300 is flipped up, and a reset switch 208 is provided above the power switch.

Figure 6:
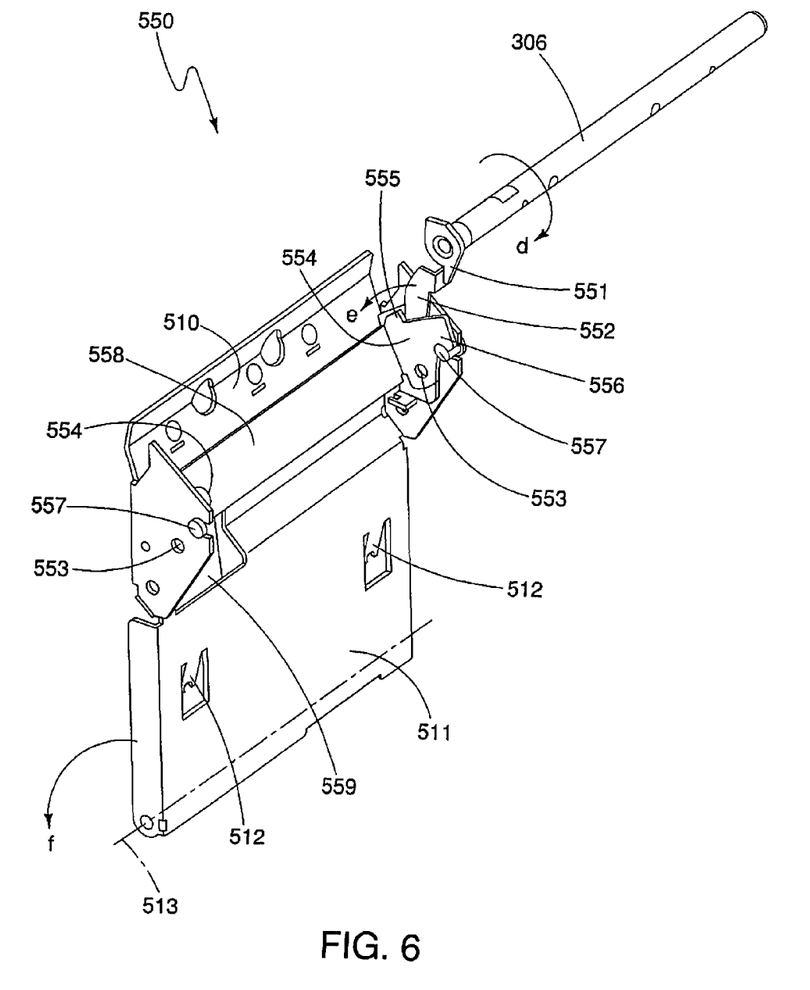
FIG. 6 is a perspective view of the primary components of the locking mechanism of the cassette-insertion gate.

FIG. 6 shows a perspective view of a locking mechanism 550 of the gate 508. The touch panel 300 is integrally linked to a shaft 306 via arms 304 (FIG. 4), and therefore, when the touch panel 300 is flipped up, the shaft 306 rotates in the direction of the arrow d in a linked fashion. A hook 551 fixed to the distal part of the shaft 306 also rotates in the direction d, and a lever 552 is made to rotate in the direction of the arrow e. The lever 552 rotates about a rotating shaft 553 in the direction of the arrow e and then hits a bent part 555 of a plate 554, and the bent part 555 rotates further about the rotating shaft 553 in the direction of the arrow e. An arcuate hook 556 provided to the plate 554 is then released from a pin 557.

A mechanism that is composed of the plate 554 and the pin 557 is also provided to the opposite side. Both of the plates 554 are linked by a linking plate 558, and therefore the same rotational motion is produced on the opposite side, as well, and the hook 556 is released from the pin 557.

The configuration is such that the pins 557 on both sides are fixed to the frame of the lower casing 200, and the gate 508 rotates about a shaft 513 in the direction of the arrow f, the shaft 513 being provided to the lower end of a panel 511. Therefore, while the hook 556 is interlocked with the pin 557, the turning radius of the hook 556 rotated about the rotating shaft 553 is smaller than the turning radius of the gate 508 rotated about the shaft 513, and therefore the rotation of the gate 508 rotated about the shaft 513 is blocked by the pins 557. However, when the hooks 556 are released from the pins 557, blockage due to the pin 557 is released, and the gate 508 therefore rotates about the shaft 513 in the direction of the arrow f and is opened. A hand-operated lever 559 that extends downward is provided to the linking plate 558. This lever 559 is visible through an operating window 560 on the front surface of the gate 508 shown in FIGS. 1, 8, and 9. If the hand-operated lever 559 is pressed from the operating window 560, the hooks 556 will be released from the pins 557 in the same manner. The thermal head 509 is attached to a distal-end frame part 510 in FIG. 6. A bent part 512 is provided to a panel 511 therebelow, and the rear surface of the front cover of the gate 508 is fixed to the bent part 512.

Returning to FIG. 4, the touch panel 300 is attached to the upper part of the front surface of the lower casing 200 via two tilt mechanisms 301, 302. The first tilt mechanism 301 causes the touch panel 300 to revolve about a rotating shaft 303, which is provided to the rear surface of the touch panel 300, to the desired angle with respect to the arms 304, whereby the angle of inclination of the touch panel 300 can be freely changed. The second tilt mechanism 302 is linked to the motions for flipping up the touch panel 300 and opening the cassette-insertion gate 508. The arms 304 are fixed via a bracket 308 to the shaft 306 provided to the upper part of the front surface of the lower casing 200. When the touch panel 300 is flipped up, the arms 304 and the bracket 308 rotate about the shaft 306 along with the motion of flipping up, and the touch panel 300 thereby flips up to the state shown in FIG. 5.

A friction mechanism is built into the rotating shaft 303 of the first tilt mechanism 301, and the inclined position of the touch panel 300 is held at the desired angle. A torque limiter 307 is provided to the left end of the shaft 306, and the touch panel 300 is held in the flipped-up position. The hook 551 of FIG. 6 is fixed to the right end of the shaft 306, and the hook 551 rotates in a linked fashion with the flipping-up motion of the touch panel 300.

A cover is laid on the tilt mechanism 301 in FIG. 5, but the cover is removed in FIG. 4.

Various function keys for operating the printer 500 and/or the measuring device are displayed on the touch panel 300. Additionally, the display can be switched to a screen showing operational messages, product information, and/or other information read from a memory 230 (see FIG. 10). The display part 310 is identical and is provided to the rear surface of the lower casing 200, i.e., to a secondary side surface.

Figure 7:
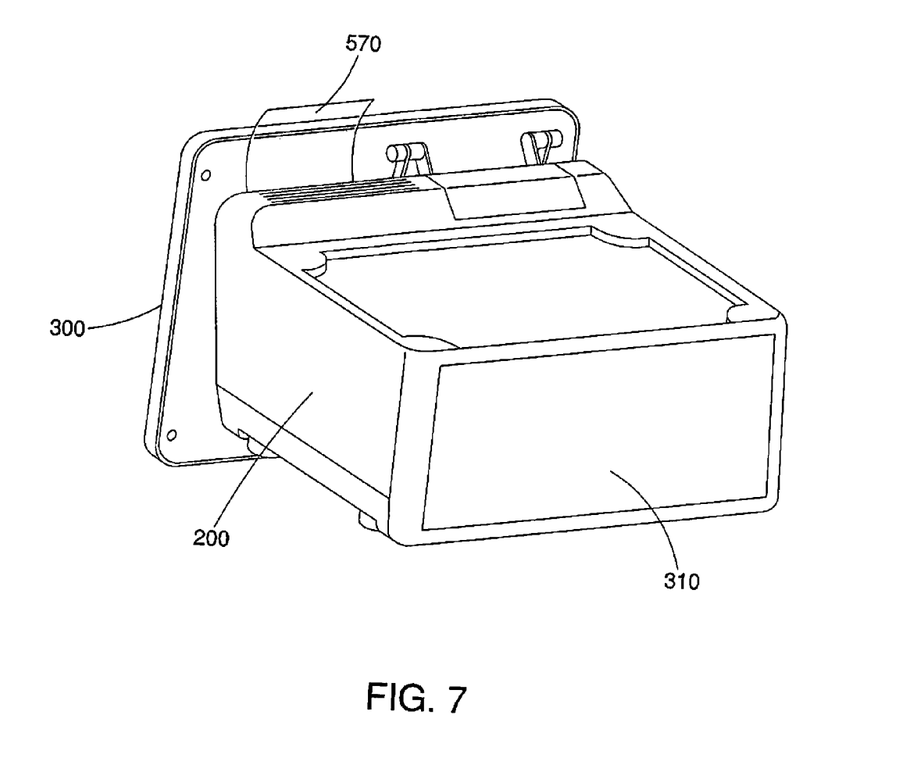
FIG. 7 is an exterior perspective view of the lower casing of the embodiment from the customer's perspective.

FIG. 7 is a perspective view showing the customer's view of the lower casing 200. The display part 310 is attached to the secondary side surface and displays the name, weight, price, promotional text, and other information related to the product being weighed.

Figure 8:
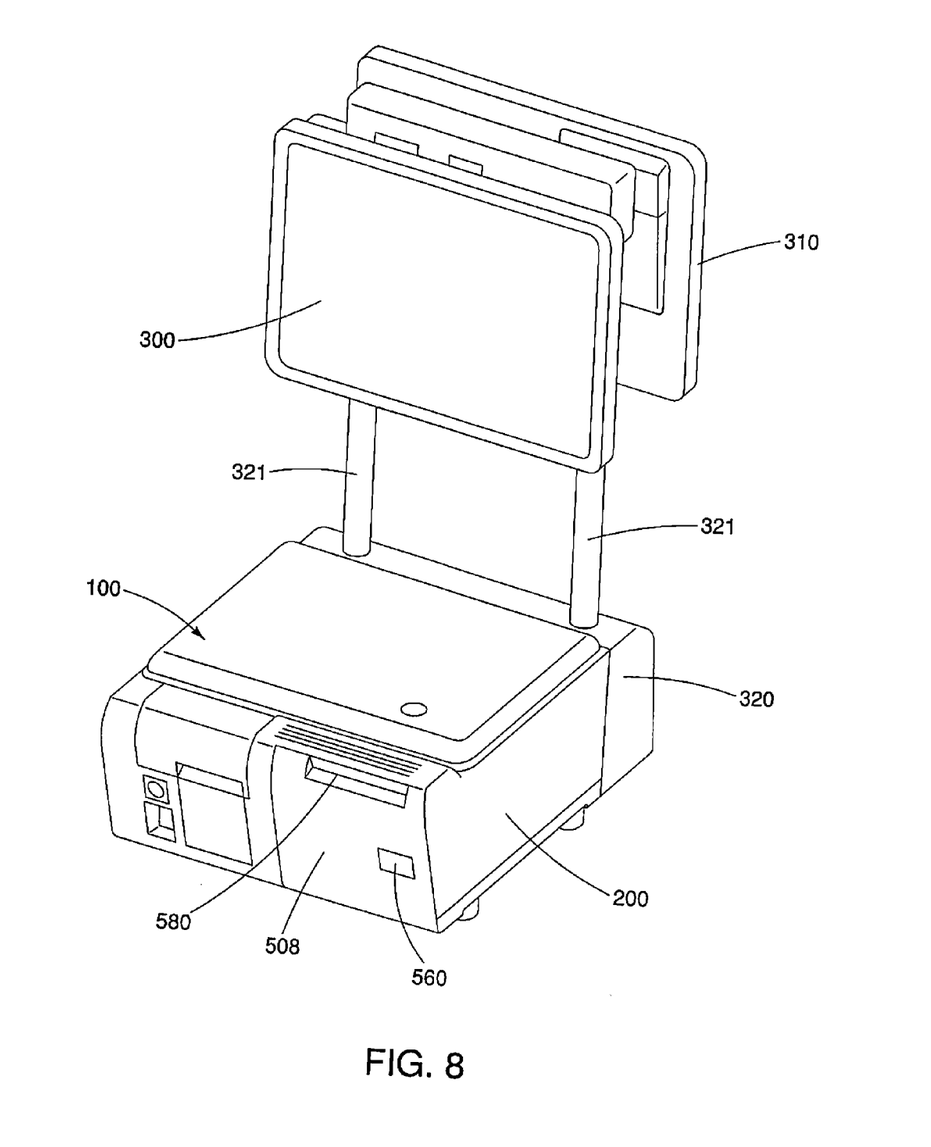
FIG. 8 is an exterior perspective view of a label printing scale device according to another embodiment of the invention.

FIG. 8 shows a label printing scale device according to another embodiment. In this embodiment, a pole-attaching part 320 is provided to the secondary side surface of the lower casing 200. The touch panel 300 and the customer-side display part 310 are attached to the distal-end parts of a pair of poles 321 that rise from the pole-attaching part.

FIG. 9 shows a label printing scale device according to a further embodiment. In this embodiment, the touch panel 300 is attached to the front surface of the lower casing 200, while the customer-side display part 310 is attached to the distal-end parts of the pair of poles 321. In order to measure large-sized products, the weighing tray B according to this embodiment is formed wider than the weighing tray B shown in FIG. 1. A handle that acts as a hand grip is therefore attached to the base member 102 of the upper casing 100.

Figure 10:
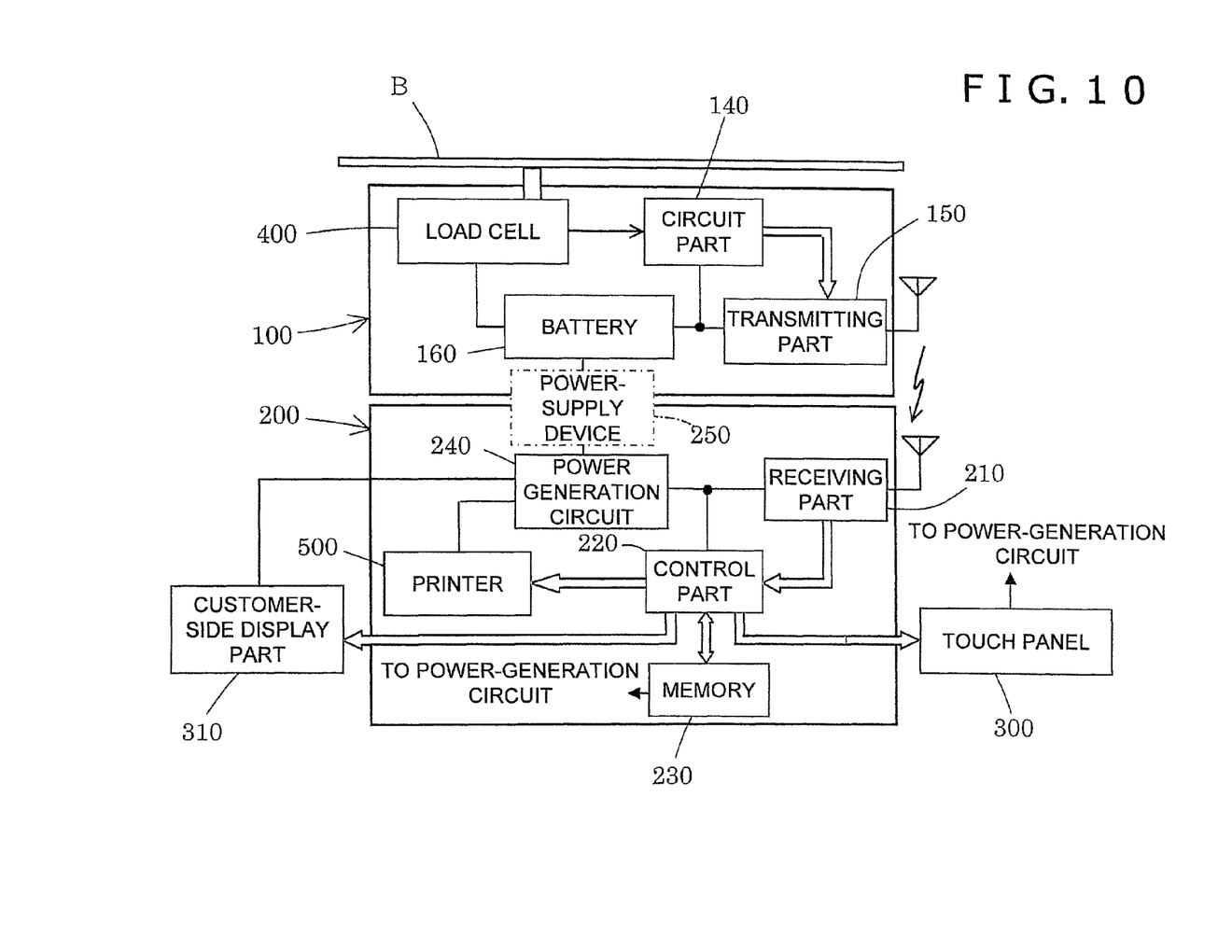
FIG. 10 is a block diagram of the label printing scale devices according to the embodiments.

FIG. 10 is a block diagram that shows the devices built into the embodiments above. In this diagram, the upper casing 100 houses the load cell 400, the circuit part 140 that performs signal processing on the analog output of the load cell and outputs digital signals, the transmitting part 150 that wirelessly transmits the digital output of the circuit part 140, and the battery 160 that supplies electrical power to these devices. On the other hand, the lower casing 200 houses a receiving part 210 for receiving the signals sent from the transmitting part 150; a control part 220 composed of a micro-computer for generating display data and/or printing data on the basis of weight signals outputted from the receiving part 210 and product information read from the memory 230 due to operation of the touch panel 300; the printer 500 that takes the printing data as input and prints labels or receipts; and a power generation circuit 240 that supplies electrical power to these devices.

The touch panel 300 and customer-side display part 310 are attached externally to the lower casing 200. These components receive transmissions of display data from the control part 220, receive electrical power from the power generation circuit 240, and display product names, weights, prices, messages, and the like on the screens.

Figure 11:
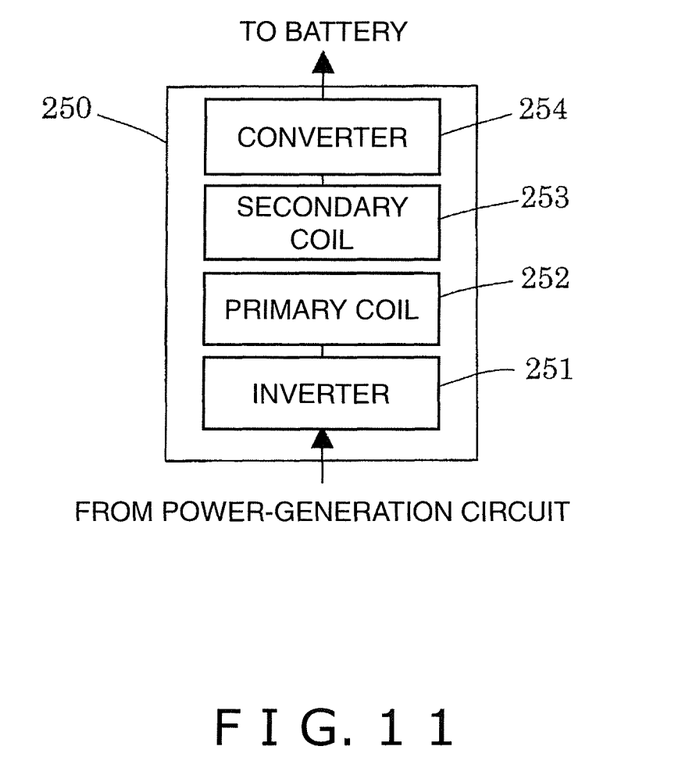
FIG. 11 is a block diagram of the wireless power-supply device used in the embodiments above.

A dry cell is used at the battery 160, but a rechargeable secondary cell can also be used. In such instances, e.g., an electromagnetic-induction type wireless power-supply device 250 is installed. As shown in FIG. 11, the power-supply device 250 converts direct-current power outputted from the power generation circuit 240 to high-frequency waves in an inverter 251 and sends these waves to a primary coil 252. High-frequency electric current is excited in a secondary coil 253 by electromagnetic induction. This current is converted into direct current by a converter 254, and a prescribed voltage is then supplied to the battery 160. In cases where this power-supply device 250 is used, the inverter 251 and the primary coil 252 are housed on the rear surface of the upper lid of the lower casing 200, and the secondary coil 253 and the converter 254 are housed in the upper casing 100 where they become close to the inverter 251 and the primary coil 252 when the upper casing 100 lays on the lower casing 200. If this configuration is used, the secondary cell can be charged merely by laying the upper casing 100 on the lower casing 200 at a prescribed position.

Figure 12:
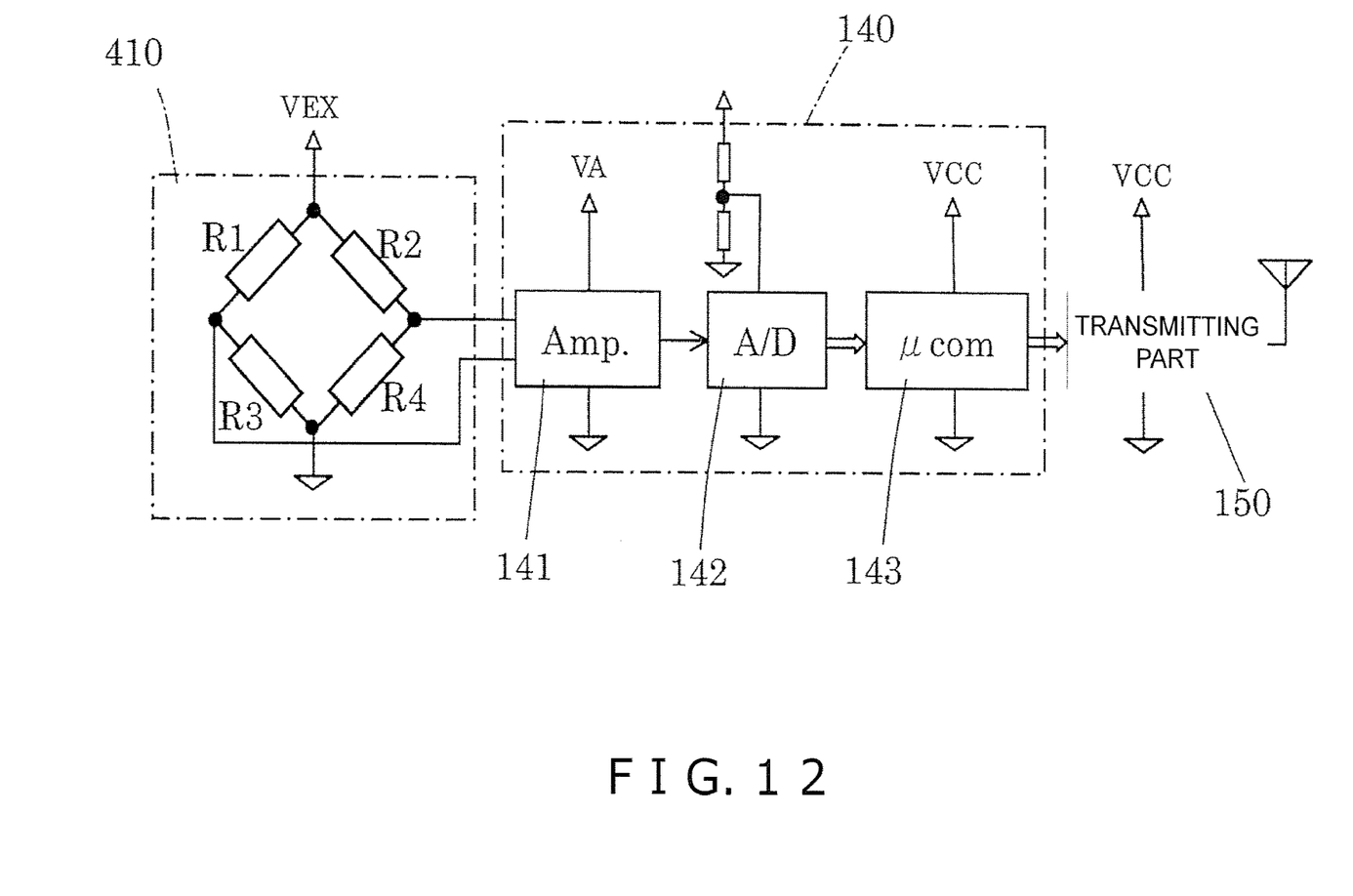
FIG. 12 is a block diagram of the load cell and the circuit part housed in the upper casing.

FIG. 12 shows the configuration of a bridge circuit 410 of the load cell 400 and the circuit part 140. Compensating strain gauges that compensate for thermal expansion and/or changes in Young's modulus of the strain-receiving part 401 resulting from temperature changes are used as strain gauges R1, R2, R3, R4 used in the load cell 400. The bridge circuit 410 is formed by the strain gauges R1, R2, R3, R4, and the analog output of this circuit is amplified by a pre-amp 141, then converted to digital quantities by a sigma-delta-type A/D converter 142, inputted to a micro-computer 143, in which noise components are filtered, and outputted to the transmitting part 150 as a digital weight signal.

A prescribed voltage is supplied to these devices from the battery 160. The circuit part 140 includes the pre-amp 141, the A/D converter 142, and the micro-computer 143.

Meanwhile, the digital weight signals emitted from the transmitting part 150 are received by the receiving part 210 within the lower casing 200 and outputted to the control part 220. In the control part 220, the unit price of the specified production is read from the memory 230, a price is calculated on the basis of the unit price read and the product weight inputted from the receiving part 210, and the calculated price and the product information read are outputted to the customer-side display part 310 and the touch panel 300.

The product information including names and unit prices of all handling products, and/or messages are recorded in the memory 230. When the touch panel 300 is operated, this information is read and displayed on the touch panel 300 and/or the customer-side display part 310.

Embodiments of the invention were described above, but the invention is not limited to these embodiments, and other formats can be employed.

For example, in FIG. 10, the transmitting part 150 and the receiving part 210 were provided, and weight signals were transmitted wirelessly, but instead digital weight signals may be transmitted from the circuit part 140 to the control part 220 via a cable. In such instances, electrical power can also be supplied from the power generation circuit 240 to the battery 160 by a cable. Electrical power may also be supplied directly from the power generation circuit 240 to the devices within the upper casing 100 without using the battery 160.

The wireless power-supply device 250 can be omitted, in which case, e.g., a connector is attached to the bottom surface of the upper casing 100 and the upper lid of the lower casing 200 at an opposed position. When the upper casing 100 is laid on the lower casing 200, the connector is connected, and power can be supplied to the battery 160.

Self-temperature-compensating strain gauges and temperature-sensitivity-compensating strain gauges were used in FIG. 12, but if temperature sensors are built into the bridge circuit, and functions for compensating for a zero point that changes according to the room temperature are built into the micro-computer 143 at the software level, compensation need not be implemented at the hardware level, and a more inexpensive high-precision measuring device can be obtained.

REFERENCE SIGNS LIST

A Label printing scale device
B Weighing tray
100 Upper casing
101 Leg parts
102 Base member
103 Tray-receiving member
140 Circuit part
150 Transmitting part
160 Battery
200 Lower casing
210 Receiving part
220 Control part
230 Memory
240 Power generation circuit
250 Wireless power-supply device
300 Touch panel
310 Customer-side display part
321 Poles
400 Load cell
500 Printer
508 Cassette-insertion gate (gate)
570 Labels or receipts
580 Issuing aperture

What is claimed is:

1. A type of label printing scale device, comprising:

an upper casing housing a load cell, a battery, a transmitting part and a circuit part, the load cell being configured to output an analog signal representing measured weight of an object loaded on a weighing tray operably coupled to the load cell, and the circuit part being configured to convert the output from the load cell into a digital weight signal, the battery supplying power to the load cell and the circuit part, the transmitting part wirelessly transmitting the digital weight signal outputted by the circuit part;

a lower casing housing a control part, a printer, a receiving part and a power-generation circuit, the control part being configured to receive the digital weight signal outputted by the circuit part of the upper casing and output printing data, the printer printing predetermined information on a label or a receipt based on the printing data, and the power-generation circuit supplying electrical power to at least the control part and the printer, the receiving part wirelessly receiving the digital weight signal and outputting the signal to the control part, wherein the upper casing and the lower casing are separate structures isolating the power-generation circuit from the load cell, the upper casing and the lower casing being further configured such that one is vertically overlaid over the other and the upper casing and the lower casing are also configured to be moved and separated from one another, the upper casing having a metal base member, a metal tray-receiving member laid above the metal base member, and a cushion member fixed to the metal tray-receiving member, the weighing tray being mounted on the metal tray-receiving member, and the cushion member being interposed between the load cell and the weighing tray.

2. The label printing scale device according to claim 1, wherein the metal base member has a leg part; and the metal tray-receiving member is laid above and spaced apart from the base member without contacting the base member, the weighing tray being mounted on the metal tray-receiving member, and the metal tray-receiving member and the base member are vertically coupled via the load cell.

3. The label printing scale device according to claim 2, further comprising:

a touch panel configured for operator input, the touch panel installed on a primary side surface of the lower casing;

a display part that displays a product name, weight, and price of the product, the display part being provided to a secondary side surface, the secondary side surface located opposite from the primary side surface; and an issuing aperture for the label and/or the receipt of the printer, the issuing aperture being formed on an upper part on a back side of the touch panel.

4. The label printing scale device according to claim 3, comprising:

a cassette-insertion gate provided to a front surface of the printer, the cassette-insertion gate including a locking mechanism, and the touch panel is pivotally attached to the lower casing and is coupled to the locking mechanism such that with the touch panel being flipped upward, the cassette-insertion gate is unlocked by the upward movement of the touch panel.

5. The label printing scale device according to claim 2, further comprising a pole extending upward on a secondary side surface of the lower casing, a display part for displaying product name, weight, and price of the product being provided at an upper end of the pole.

6. The label printing scale device according to claim 1, wherein the battery is a rechargeable secondary cell; and with the upper casing mounted on the lower casing, the secondary cell connects to the power-generation circuit.

7. The label printing scale device according to claim 6, further comprising a power-supply device wirelessly supplying electrical power from the power-generation circuit to the secondary cell.

8. The label printing scale device according to claim 7, further comprising a pole extending upward on a secondary side surface of the lower casing, a display part for displaying product name, weight, and price of the product being provided at an upper end of the pole.

9. The label printing scale device according to claim 6, further comprising:

a touch panel configured for operator input, the touch panel installed on a primary side surface of the lower casing;

a display part that displays a product name, weight, and price of the product, the display part being provided to a secondary side surface, the secondary side surface located opposite from the primary side surface; and an issuing aperture for the label and/or the receipt of the printer, the issuing aperture being formed on an upper part on a back side of the touch panel.

10. The label printing scale device according to claim 9, comprising:

a cassette-insertion gate provided to a front surface of the printer, the cassette-insertion gate including a locking mechanism, and the touch panel is pivotally attached to the lower casing and is coupled to the locking mechanism such that with the touch panel being flipped upward, the cassette-insertion gate is unlocked by the upward movement of the touch panel.

11. The label printing scale device according to claim 6, further comprising a pole extending upward on a secondary side surface of the lower casing, a display part for displaying product name, weight, and price of the product being provided at an upper end of the pole.

12. The label printing scale device according to claim 1, further comprising:

a touch panel configured for operator input, the touch panel installed on a primary side surface of the lower casing;

a display part that displays a product name, weight, and price of the product, the display part being provided to a secondary side surface, the secondary side surface located opposite from the primary side surface; and an issuing aperture for the label and/or the receipt of the printer, the issuing aperture being formed on an upper part on a back side of the touch panel.

13. The label printing scale device according to claim 12, comprising:

a cassette-insertion gate provided to a front surface of the printer, the cassette-insertion gate including a locking mechanism, and the touch panel is pivotally attached to the lower casing and is coupled to the locking mechanism such that with the touch panel being flipped upward, the cassette-insertion gate is unlocked by the upward movement of the touch panel.

14. The label printing scale device according to claim 1, further comprising a pole extending upward on a secondary side surface of the lower casing, a display part for displaying product name, weight, and price of the product being provided at an upper end of the pole.

15. The label printing scale device according to claim 1, wherein the metal tray-receiving member and the metal base member are vertically coupled to one another via the load cell, the load cell being located in a central part of the upper casing.

16. The label printing scale device according to claim 1, wherein the metal base member includes a reinforcing rib formed on the upper surface thereof.

17. The label printing scale device according to claim 1, wherein the load cell includes a strain-receiving part that is configured to output the analog signal, and the cushion member extends directly over the strain-receiving part of the load cell and directly between the strain-receiving part and the weighing tray.

* * * * *